United States Patent
Subramanian et al.

(10) Patent No.: US 6,247,766 B1
(45) Date of Patent: Jun. 19, 2001

(54) BRAKE CONTROL SYSTEM WITH AN ISOLATION VALVE

(75) Inventors: Viswanathan Subramanian, El Paso, TX (US); Earl Wayne Lloyd, Lebanon, OH (US); David Fredrick Reuter; William Dale Cornwell, both of Beavercreek, OH (US); Sanjay Manilal Patel, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/304,877

(22) Filed: May 4, 1999

(51) Int. Cl.[7] ........................................................ B60T 8/36
(52) U.S. Cl. ............................................................. 303/119.2
(58) Field of Search ........................... 303/115.1, 115.2, 303/115.4, 119.1, 119.2

(56) References Cited

U.S. PATENT DOCUMENTS

| | | | |
|---|---|---|---|
| 5,246,280 | * | 9/1993 | Sigl ................................... 303/119.1 |
| 5,588,718 | * | 12/1996 | Winner et al. ..................... 303/119.1 |
| 5,645,325 | * | 7/1997 | Mueller et al. ................... 303/119.2 |
| 5,649,748 | * | 7/1997 | Oehler et al. ..................... 303/119.2 |
| 5,669,675 | * | 9/1997 | Mueller et al. ................... 303/119.2 |
| 5,879,060 | * | 3/1999 | Megerle et al. .................. 303/119.2 |

* cited by examiner

Primary Examiner—Christopher P. Schwartz
(74) Attorney, Agent, or Firm—Margaret A. Dobrowitsky

(57) ABSTRACT

A vehicle braking system has a self-apply control which is effective to control the vehicle wheels under braking situations, traction control situations and chassis control situations. The self-apply control includes an electronic control unit (ECU) to establish the operation of the brakes. A positive displacement pump is utilized to provide fluid during self-apply operation. The output pressure of the pump is controlled by a variable pressure isolation valve which is controlled by the ECU to establish the maximum pressure required during each situation such that excess fluid pressure is not generated at the pump. the isolation valve has a stepped diameter bore in which a valve spool is disposed. The valve spool and the bore cooperate to form a unique dampening structure. The valve land and the bore wall form a flow restriction to and from a dampening chamber formed by the bore step and the valve land. This dampening reduces the pressure pulsation at the pump outlet for improved performance in the brake control system.

10 Claims, 3 Drawing Sheets

BRAKE CONTROL SYSTEM WITH AN ISOLATION VALVE

TECHNICAL FIELD

This invention relates to brake control systems in wheeled vehicles and more particularly to brake control systems having a valve mechanism for establishing the maximum system pressure during self-apply operation.

BACKGROUND OF THE INVENTION

In many currently produced automotive vehicles, the brake systems are both manually applied, with power assist, and self applied during anti-lock operation and in some vehicles during traction control of the driving wheels. During manual brake application, the operator depresses the brake pedal to determine the amount of braking pressure that will develop in the system at the braking wheels. During self-apply braking, the system pressure is established by a system regulator valve.

The regulator valve sets the maximum system pressure at a fixed value regardless of the system requirements. The excess fluid flow is exhausted through the regulator valve resulting in noise and vibration from the hydraulic system which is discernable by the operator. While this occurrence is not detrimental to the braking system or the vehicle, it can be disconcerting to the operator when it occurs unexpectedly.

SUMMARY OF THE INVENTION

It is an object of the present invention to provide an improved brake control system having an isolation valve for establishing the maximum system pressure during self-apply operation.

In one aspect of the present invention, a brake control system has a manually operable master cylinder to supply fluid to establish normal braking and a positive displacement hydraulic pump to supply fluid during self-apply braking. In another aspect of the present invention, an isolation valve is disposed in fluid flow relation between the output of the master cylinder and the output of the pump to control the pressure output of the pump during self-apply operation. In yet another aspect of the present invention, the isolation valve is a normally open valve to permit the master cylinder to supply fluid to all of the vehicle brakes during normal brake operation.

In still another aspect of the present invention, the isolation valve controls the pump output to at least some of the vehicle brakes during a self-apply traction control operation. In yet still another aspect of the present invention, the isolation valve has a damping chamber comprised of a cylindrical body, a annular restriction and an annular chamber.

In a further aspect of the present invention, the isolation valve has a body with a stepped diameter bore with long central small diameter portion and a short large diameter portion and a valve spool having a long rod portion disposed in the central small diameter, a land portion slidably disposed in the large diameter and a valve member cooperating with a valve seat. In yet a further aspect of the present invention, the land portion and the large diameter portion cooperate to provide the annular restriction.

DESCRIPTION OF AN EXEMPLARY EMBODIMENT

Figure 1:
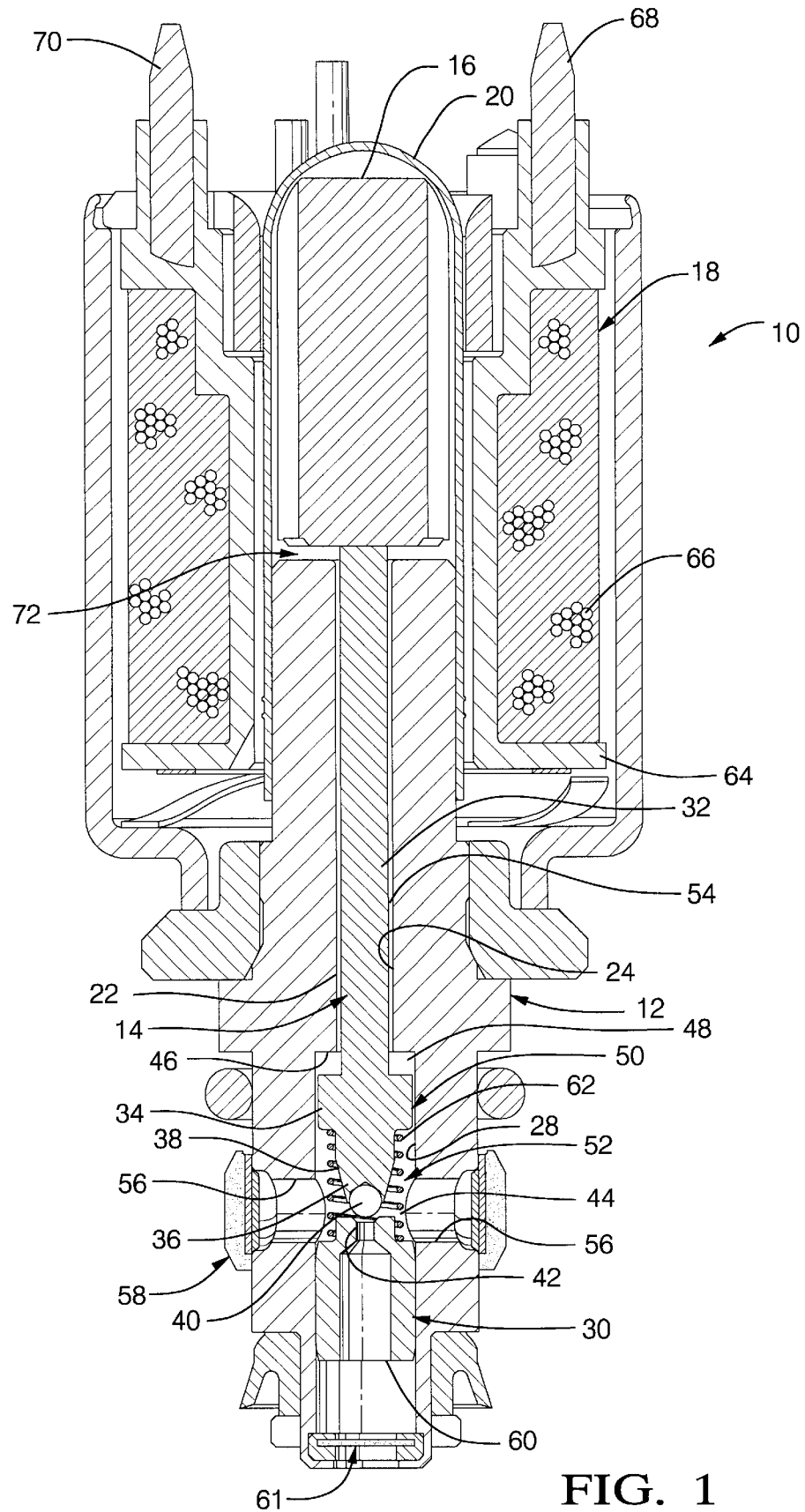
FIG. 1 is an elevational view, in section, of an isolation valve incorporating the present invention.

Referring to the drawings wherein like characters represent the same or corresponding parts throughout the several views there is seen in FIG. 1 an isolation valve, generally designated 10. The valve 10 has a body 12, a valve spool 14, and armature 16, a solenoid 18 and a cup 20. The body 12 has a longitudinally extending central stepped diameter bore 22 including a large diameter 28, and a small diameter 24. A valve seat 30 is pressed into or otherwise secured in the large diameter 28.

The valve spool 14 has a long rod portion 32 disposed in the small diameter bore 24, a cylindrical valve land 34 slidably disposed in the large diameter 28 and a valve portion 36 also disposed in the large diameter 28. The valve portion has a substantially conical portion 38 terminating in a sphere or ball 40 which cooperates with a conical opening or seat 42 to establish a variable valve orifice or restricted passage 44. The size of the passage 44 is dependent on the position of the ball 40 relative to the conical seat 42. The valve land 34 has an annular wall which cooperates with an annular step 46 in the bore 22 to from a chamber 48. The radial clearance between the valve land 34 and the large diameter 28 form an restricted flow passage 50 between the chamber 48 and a fluid outlet chamber 52. The passage 50 and the chamber 48 constitute a fluid dampening structure that controls the rapidity with which the valve spool 14 will vibrate under the influence of the solenoid 18. As the valve spool 14 is oscillated in the bore 22 under the influence of the solenoid 18 being energizes, fluid is displaced from or drawn into the chamber 48. As is well-known, this will slow the reaction of the valve spool 14 such that the valve spool 14 will seek a more constant position. The clearance 54 between the rod 32 and the small diameter 24 is large by comparison with the passage 50 such this clearance 54 has no noticeable shear damping effect on the valve spool 14.

The outlet chamber 52 communicate with a pair of outlet passages 56 which extend radially through the body 12. Fluid leaving the valve 10 passes through the outlet passages 56 and also through a filter assembly 58 which surrounds the body 12. The outlet chamber 52 is in controlled fluid communication with an inlet passage 60 through the valve seat 30. The amount of fluid entering the outlet chamber 52 from the inlet passage 60 is determined by the position of the valve spool 14 and the pressure at the inlet port 60. The fluid entering the inlet port 60 passed through a filter 61.

A spring member 62 is disposed in compression between the valve seat 30 and the valve land 34 to urge the valve spool 14 away from the valve seat 30. The spring 62 applies a very light load to the valve spool 14 such that only a minor amount of force from the solenoid 18 is used in overcoming the load of the spring 62. The spring is not a necessary component in the valve 10 and is present only to ensure proper evacuation and filling of the fluid system in which the valve 10 is employed.

Figure 2:
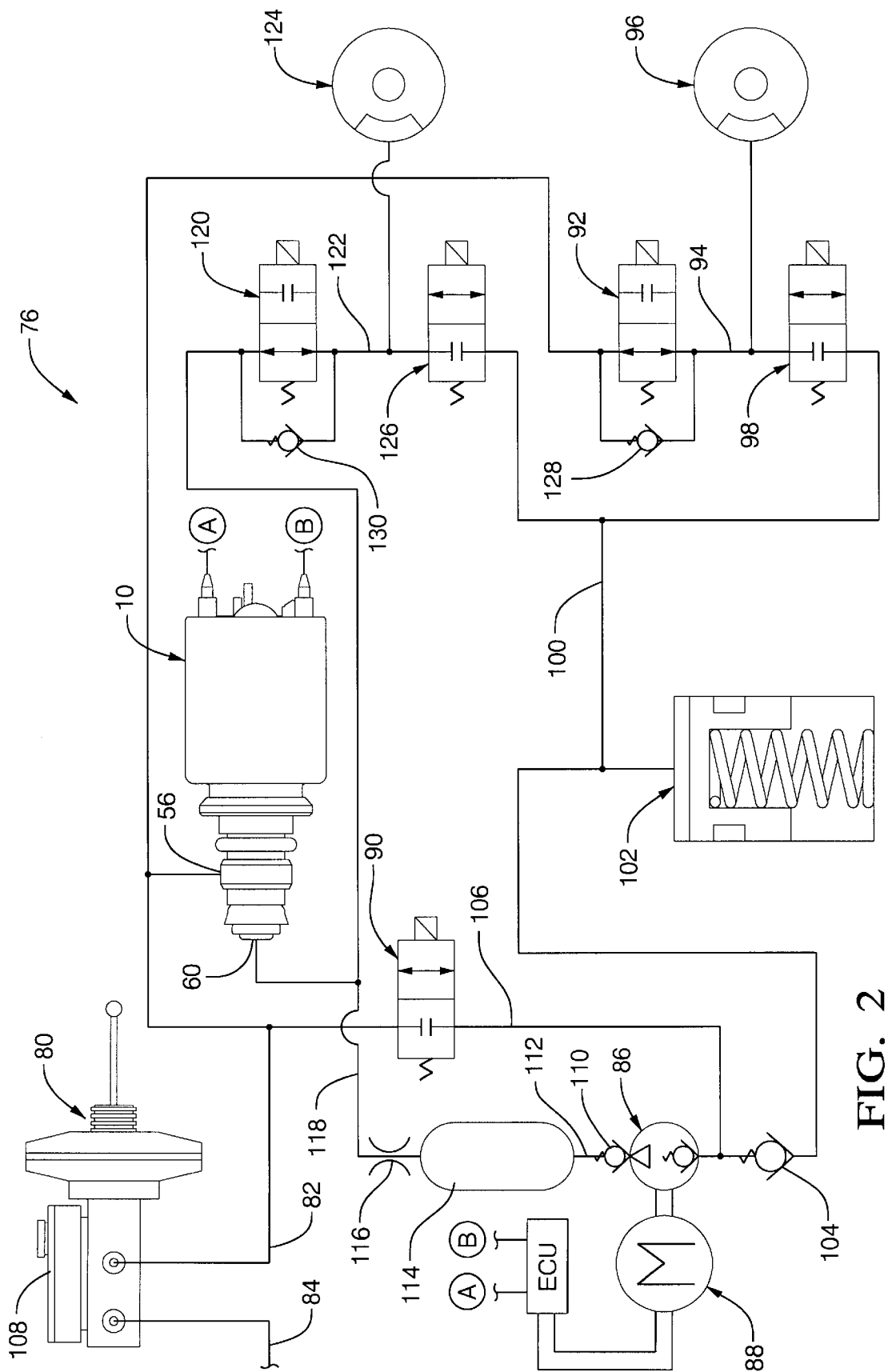
FIG. 2 is a schematic representation of a braking system and isolation valve depicting one embodiment of the present invention.
Figure 3:
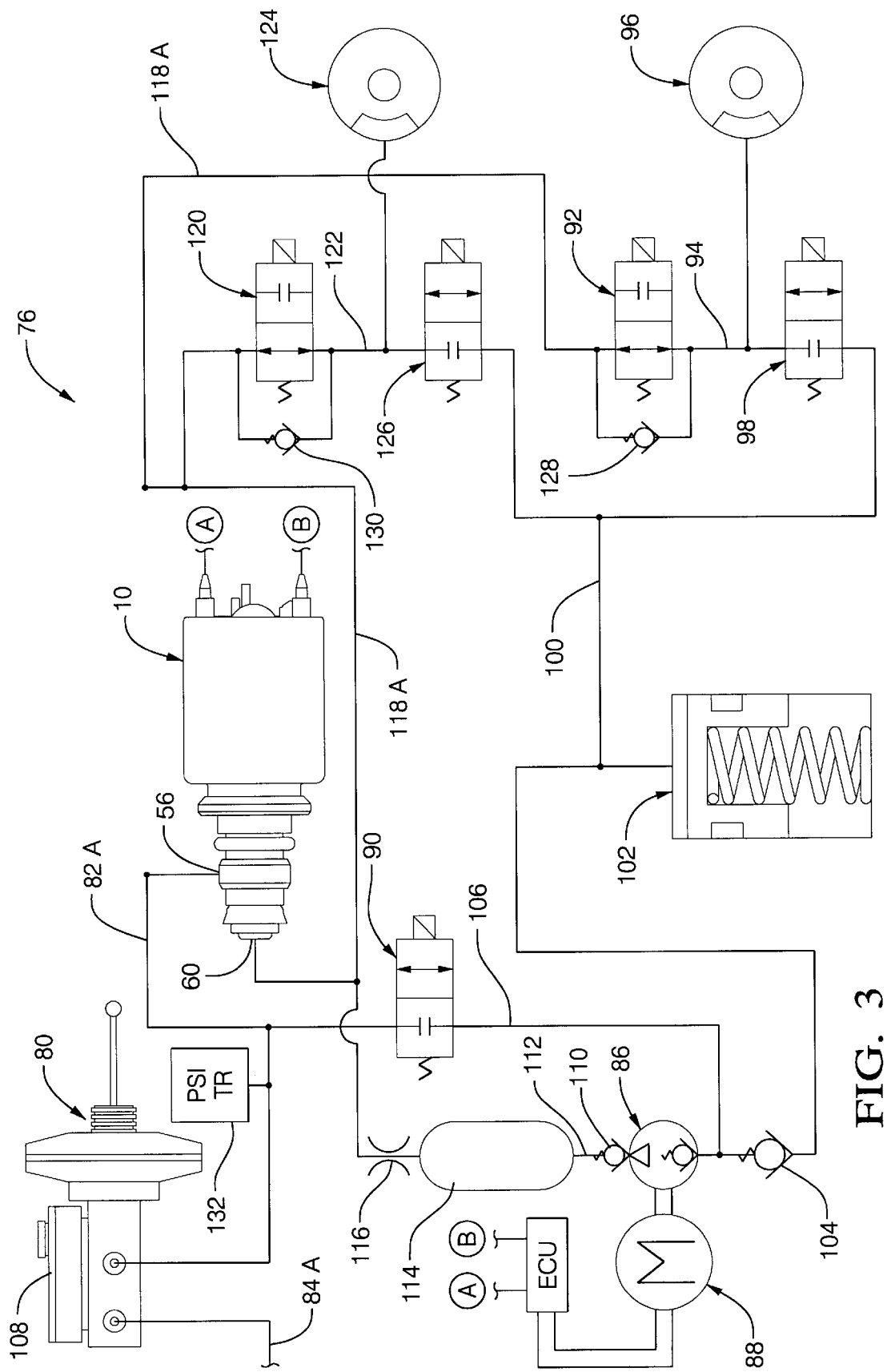
FIG. 3 is a schematic representation of a braking system and isolation valve depicting another embodiment of the present invention.

The solenoid 18 is comprised of a spool 64, a wire coil 66 wrapped on the spool 64 and a pair of terminals 68, 70 attached to respective ends of the wire coil 66. The terminals 68 and 70 are connected with the positive and negative terminals of a conventional electric power system, not shown, through an electronic control unit (ECU), as shown in FIGS. 2 and 3. The ECU incorporates a conventional programmable digital computer such as those found on many of the currently available passenger vehicles. As is well-known the ECU can be operated to issue a voltage at a variable duty cycle which will energize the wire coil 66 of the solenoid 18. This will cause the armature 16 to oscillate with the cup 20 which will enforce movement of the valve spool 14. By controlling the duty cycle at the wire coil 66, the pressure at the inlet port 60 is controlled. The passage 50 and the chamber 48 cooperate to limit the vibration in the fluid pressure that might otherwise be evident without this unique dampening arrangement.

As is well-known with solenoid valves the magnetic flux travels from the coil 66 to the armature 16 then across an air gap 72 to the body 12 and back to the coil 66. The air gap 72 is an important feature in the flux path. If the width of air gap 72 is maintained within a predetermined range, the force on the armature and therefore spool 14 will be essentially linear relative to the energy imposed on the coil 66. To maintain the air gap 72 is the desired range, the passage 52 is limited to a predetermined range. The passage 52 will be fully closed by the ball 40 engaging the conical opening 42 and fully opened when the armature 16 abuts the cup 20. The cup 20 is installed on and secured to the body 12 such that the limits of the passage 52 are within the desired range. The preferable method of securing the cup 20 to the body 12 is by welding. The cup 20 is manufactured from a non-magnetic material such as stainless steel. Other than the limitations imposed on the air gap 72 and the size of the restricted passage 50, the isolation valve 10 can be manufactured in accordance with any of the currently available assembly techniques.

The terminals 68 and 70 are electrically connected with the ECU and receive voltage signals therefrom. The signal is cycled, in a well-known manner by the ECU, to establish the pressure at the inlet passage 60. The pressure at the inlet passage 60 varies with the duty cycle to provide a variable pressure as determined by the ECU which receives input electrical signals from wheel speed sensors and transmission output speed sensors to determine if self-apply is required at the wheel brakes during either braking or loss of traction at the drive wheels.

The isolation valve 10 is employed in the vehicle brake control systems 76 and 78 shown in FIGS. 2 and 3 respectively. The brake control 76, in FIG. 2, is a two channel system only half of which is shown. In a two channel system, the isolation valve 10 is operable, during self-apply, to control the pressure at the driven wheels only. The brake control system 78 is a four channel system in which the isolation valve 10 is operable, during self-apply, to control the brakes at all four wheels as needed.

The brake control system 76 includes a conventional master cylinder 80 which is operable to produce a pressure in passages 82, 84 when the operator depresses the vehicle brake pedal, not shown. The passages 82 and 84 supply pressurized fluid to separate identical circuits. Only the circuit connected with the passage 82 is shown. It has been found that the better practice is to use two brake circuits each of which control wheels on opposite sides of the vehicle. For example, the brake system 76 will control the right front wheel brake and the left rear wheel brake. The brake system fed by the passage 84 will control the other two wheel brakes. The brake control system 76 also includes a positive displacement pump 86 which is driven by an electric motor 88. Energization of the motor 88 is provided through the ECU such that the speed thereof is controlled. This will accordingly control the output volume of the pump 86.

The passage 82 is disposed in fluid communication with a prime valve 90, the outlet passage 56 of the isolation valve 10, and a brake engage valve 92. The valve 92 is a solenoid controlled two position directional valve which is normally open to connect the passage 82 with a passage 94 which is concerted with an undriven wheel 96 and a solenoid operated release valve 98. The valve 98 is a normally closed valve that, when energized, will connect the passage 94 with a passage 100 which is connected with an accumulator 102 and the inlet of the pump 86 through a check valve 104.

The prime valve 90 is a normally closed solenoid controlled valve which has an outlet passage 106 which is connected with the inlet of the pump 86. When the valve 90 is energized, the passage 106 is connected with the passage 82 and therefore with a reservoir 108 of the master cylinder 80. When the motor 88 is energized by the ECU, the prime valve 90 is also energized and the inlet of the pump 86 is in communication with the reservoir 108.

The pump 86 is connected, through a check valve 110, with an outlet passage 112 which in turn is in communication with an expansion chamber or damper 114. The chamber 114 is connected through a flow restriction 116 with a passage 118 which is connected with the inlet passage 60 of the isolation valve 10 and also with a solenoid operated normally open brake apply valve 120. The valve 120 is substantially identical with the valve 92. The valve 120 is connected with an outlet passage 122 which communicates with a driven wheel 124 and a solenoid controlled normally closed brake release valve 126. The valve 126 is substantially identical with the valve 98. When energized. the valve 126 will communicate the passage 122 with the passage 100 and therefore the inlet of the pump 86.

The passages 82 and 94 are connected by a check valve 128 which will permit fluid to flow from the passage 94 to the passage 82 when the pressure in the passage 94 is higher than the pressure in the passage 82. The passages 118 and 122 are connected by a check valve 130 which will permit fluid flow from the passage 122 to the passage 118 when the pressure in the passage 122 is higher than the pressure in the passage 118. The check valves 128 and 130 will permit the brakes at the wheels 96 and 124 to be disengaged when the brake system 76 is inactive.

As described above, the isolation valve 10 is a normally open valve such that the passages 118 and 82 will be connected when the brake system 76 is inactive. This permits the brake at the driven wheel 124 to be connected with the master cylinder 80. The master cylinder 80 will supply pressurized fluid to the brakes of both the driven wheel 124 and the undriven wheel 96 when the operator wishes to engage the vehicle brakes. During normal braking, the valves 90, 92, 98, 120 and 126 are in their normal spring set positions.

When the operator has actuated the master cylinder to apply the brakes, but the ECU senses that self-apply is necessary, the prime valve 90 is energized to permit fluid communication between the passage 82 and the inlet of the pump 86. At the same time the pump 86 will be driven by the motor 88 and the valves 120 and 126 will be controlled to prevent the driven wheel from being locked by the brake in a well-known manner. Likewise the valves 92 and 98 will be controlled to prevent a lock condition from occurring at the undriven wheel 96. If the pressure in the passage 82 is not sufficient to permit the positive control needed at the wheels 96 and 124, the isolation valve 10 will be controlled to provide the required pressure at the wheel 124. However, the isolation valve 10 will not permit the pressure to exceed this value thus saving energy which is expended in conventional brake systems using a mechanical regulator valve.

When the ECU senses that the driven wheel is slipping, during normal driving, the ECU will energize the valve 90 and the motor 88 such that the pump 86 will draw fluid from the reservoir 108 and deliver fluid to the passage 118. The pressure in the passage 118 will be determined by the duty cycle imposed on the isolation valve 10 by the ECU. This fluid pressure is directed to the valve 120 which is controlled by the ECU to establish the proper self apply pressure at the brake of the driven wheel 124 to maintain traction.

The valve 126 is also energized to assist in the control of the pressure at the brake of the driven wheel 124. This is traction control which will prevent a wheel from overspeeding relative to ground speed. As with self-apply during vehicle braking, the isolation valve 10 will limit the pressure in the passage 118 to the maximum pressure necessary for proper control to the driven wheel 124, thus preventing the pump from producing excess pressure and thereby reducing the energy consumption during self-apply operation as compared with the prior art systems. The brake system 76 has a conventional brake switch which senses any manual brake apply by the operator during traction control self-apply to discontinue the self-apply function.

The brake control system 78 depicted schematically in FIG. 3 is similar to the brake control system 76 described above. The brake control system 78 is designed as a four channel system. The master cylinder 80 is connected through passage 82A with the outlet 56 of the isolation valve 10 and with the prime valve 90. The passage 82A is not directly connected with the brake of the wheel 96. In operation of the brake control system 78, the operator can pressurize the system manually by depressing the brake pedal, not shown, to actuate the master cylinder 80 and thereby pressurize the passage 82A. the fluid in passage 82A will flow through the isolation valve 10 from the outlet passage 56 to the inlet passage 60 and into the passage 118A.

During self-apply braking, the prime valve 90 is opened to permit communication between the pump 86 and the reservoir 80. The isolation valve 10 will be controlled by the ECU to establish the desired pressure in the passage 118A. this pressure will be delivered to both brake apply valves 92 and 120. The ECU determines which of the valves 92 and 120 should be closed to prevent pressure from engaging the brake at the respective one of wheels 96 and 124.

As is well known, the brake apply valve 92 and the brake release valve 98 and the brake apply valve 120 and the brake release valve 126 can be operated in unison by the ECU to control the brake at the individual wheels 96 and 124 respectively. This system works equally well during vehicle braking self-apply and during traction control self-apply. The system can therefore be utilized with four wheel drive or all wheel drive applications. The self-apply braking system of the four channel system shown in FIG. 3 is also useful with active suspension systems or vehicle stability control system. For example, the active vehicle stability system can sense an oversteer or understeer condition and self-apply the brakes as necessary to alleviate the condition.

As with the two channel brake control system 76, the isolation valve 10 ensures that the maximum pressure in the brake system is equal to the maximum pressure required for each situation. With the four channel system, all of the vehicle wheels, driven or undriven, are controlled. The isolation valve sets the maximum pressure required at any one wheel and the ECU will operate the brake apply valves 92 and 120 and the brake release valves 98 and 126 as required to establish a lower pressure at a specific wheel.

For example if one wheel requires a pressure of 600 psi for braking and the other wheels require lower pressures, the apply and release valves at those wheel are actuated to establish the required pressure. This is a considerable advantage over the prior art systems wherein the pressure in the self-apply control is established by a single pressure setting at a regulator valve. The pressure setting in the prior art systems will be at the maximum pressure expected, generally 2200 psi or higher. This results in excess energy consumption during self-apply operation requiring less than the maximum setting. the high pressure setting also contributes to noise and vibration in the prior art systems which is greatly reduced or eliminated with the present invention.

A pressure transducer 132 is included in the four channel brake control system 78. This transducer 132 will sense the application of the brake master cylinder 80 by the operator. If the operator employs the vehicle brakes during a non-braking self-apply condition, the pressure transducer 132 will inform the ECU that discontinuance of the self-apply control is required. This will permit the braking system to be controlled by the operator unless vehicle braking self-apply is required. It should be apparent that the passages 84, FIG. 1, and 84A, FIG. 2, will connect with substantially identical subsystems. Thus all four wheel of a passenger vehicle, for example, will be controlled in accordance with the present invention.

What is claimed is:

1. A brake control system for providing a variable pressure to selectively apply at least one vehicle wheel brake of the driven wheels of a vehicle comprising:

an operator controlled master cylinder having a reservoir;

a first passage for delivering fluid from said reservoir through said master cylinder to a plurality of valves including a prime valve and a plurality of brake apply valves, each of said brake apply valves being effective to control the distribution of fluid to respective vehicle wheel brakes;

a fluid pump for distributing fluid from said reservoir to at least one brake apply valve, said prime valve being disposed between said reservoir and said pump for selectively controlling inlet fluid to said pump;

an isolation valve having an inlet port connected between an outlet of said pump and the brake apply valve and an outlet port connected to release to said reservoir a portion of the fluid output of said pump in response to an electric signal, said isolation valve including a valve spool slidably disposed in a stepped diameter valve bore, electromagnetically responsive to an electric signal to exert a pressure against fluid flowing from said inlet port to said outlet port, and cooperating therewith to form a fluid dampening mechanism including a flow restriction formed between a cylindrical wall of a valve land on said spool and a cylindrical wall of a first portion of said stepped diameter valve bore and an expansible chamber in fluid communication with said flow restriction; and a pulsed electric signal generator connected to provide said electric signal to said isolation valve to continuously and linearly establish a maximum pressure during each self apply operation wherein said maximum pressure for each self-apply operation is not greater than the maximum pressure necessary to provide the braking effort required by at least one of the vehicle wheel brakes.

2. The brake control system defined in claim 1 further comprising:

said brake control system being operable to control the variable pressure to all of the vehicle brakes of all of the vehicle wheels during a non-braking self-apply condition;

said first passage being directly connected with said prime valve and operatively connected through said isolation valve to a second passage for connection with said brake apply valves;

said pump being in fluid communication with at least two brake apply valves through said second passage; and said chamber of said fluid dampening mechanism being formed between an annular wall of said valve land and an annular wall of said stepped diameter bore, said valve spool having an elongated stem portion disposed in a smaller diameter second portion of said stepped diameter bore with sufficient clearance to permit unrestricted movement between the valve spool and the stepped diameter bore.

3. The brake control system defined in claim 1 further comprising:

said isolation valve having an inlet port connected with said pump outlet pressure passage and said flow restriction of said fluid dampening mechanism, an outlet pressure passage connected with said first passage and said expansible chamber being formed by opposed annular walls on said valve land and said stepped diameter valve bore.

4. A brake control system comprising:

a plurality of vehicle wheels each having a brake, each brake having a pressure requirement during braking including a maximum pressure level in at least one of the brakes;

a self-apply brake control for controlling the braking effort at each wheel, including a pump having an outlet passage for supplying pressurized fluid for braking, brake control means at each wheel for controlling the pressure of the braking fluid supplied thereto, and an isolation valve disposed to control the pressure in said outlet passage and being effective to control the fluid pressure delivered by said pump to a level equal to the maximum level required by said brakes said isolation valve comprising a valve body having an inlet port connected to receive fluid from the pump, an outlet port connected to an operator controlled master cylinder having a reservoir, and a stepped diameter valve bore formed therein, a valve spool slidably disposed in said stepped diameter valve bore, a solenoid coil having a first portion surrounding a portion of said body and a second portion, an armature disposed for reciprocation in said second portion, a valve seat secured in said body adjacent the inlet port in axial alignment with said valve spool and cooperating with a valve portion of said valve spool to control a fluid passage in said stepped diameter valve bore between said inlet port and said outlet port;

said stepped diameter valve bore having a first diameter, a second diameter smaller than said first diameter and a substantially annular area joining said diameters, said valve spool having a valve land portion adjacent said valve portion and a rod portion extending axially from said valve land portion;

said land portion cooperating with said annular area to form a chamber and cooperating with said first diameter to form a restricted flow passage between said valve portion and said chamber, said restricted flow passage and said chamber cooperating to form a fluid dampening mechanism.

5. The brake control system defined in claim 4 further comprising:

said armature abutting said rod and being driven axially in one direction by said solenoid coil to urge said valve spool toward said valve seat and being limited in movement in an opposite direction by a cup member secured with said body, an air gap formed between said armature and said valve body having a maximum value when said armature abuts said cup and a minimum value when said valve spool contacts said valve seat, the extent of said air gap being maintained to provide a substantially constant magnetic flux path during movement between said maximum and minimum values of said air gap.

6. The brake system defined in claim 5 further comprising:

said rod portion and said second diameter having sufficient radially clearance to permit substantially unrestricted reciprocation of said rod portion in said second diameter when said valve spool is moving toward said valve seat under the influence of said armature.

7. An isolation valve comprising:

a valve body having an inlet port, an outlet port, and a stepped diameter valve bore formed therein, a valve spool slidably disposed in said stepped diameter valve bore, a solenoid coil having a first portion surrounding a portion of said body and a second portion, an armature disposed for reciprocation in said second portion, a valve seat secured in said body adjacent the inlet port in axially alignment with said valve spool and cooperating with a valve portion of said valve spool to control a fluid passage in said stepped diameter valve bore between said inlet port and said outlet port;

said stepped diameter valve bore having a first diameter, a second diameter smaller than said diameter and a substantially annular area joining said diameters, said valve spool having a valve land portion adjacent said valve portion and a rod portion extending axially from said valve land portion, said rod portion being much longer than said land portion;

said land portion cooperating with said annular area to form a chamber and cooperating with said first diameter to form a restricted flow passage between said valve portion and said chamber, said restricted flow passage and said chamber cooperating to form a fluid dampening mechanism;

said armature abutting said rod and being driven axially in one direction by said solenoid coil to urge said valve spool toward said valve seat and being limited in movement in an opposite direction by a cup member secured with said body, an air gap formed between said armature and said valve body having a maximum value when said armature abuts said cup and a minimum value when said valve spool contacts said valve seat, the extent of said air gap being maintained to provide a substantially constant magnetic flux path during movement between said maximum and minimum values of said air gap.

8. The isolation valve defined in claim 7 further comprising:

said rod portion and said second diameter having sufficient radially clearance to permit substantially unrestricted reciprocation of said rod portion in said second diameter when said valve spool is moving toward said valve seat under the influence of said armature.

9. A brake control system comprising:

a plurality of vehicle wheels each having a brake, each brake having a pressure requirement during braking including a maximum pressure level in at least one of the brakes;

a fluid reservoir;

a master cylinder connected to said fluid reservoir;

a brake control for controlling the braking effort at each wheel in self-apply and master cylinder apply, including a pump having an outlet passage for supplying pressurized fluid for braking, brake control means at each wheel for controlling the pressure of the braking fluid supplied thereto, and an isolation valve having an inlet connected to receive fluid from the outlet passage of the pump, an outlet connected to provide fluid to the fluid reservoir, and a valve electrically activatable in response to an electric signal in a first operational mode to oppose fluid flow through the valve from inlet to outlet thereof to provide a variably controllable pressure blow-off and de-activatable in a second operational mode to allow unopposed fluid flow therethrough from outlet to inlet thereof and thus permit operation of the brakes by master cylinder pressure, the isolation valve having a pressure controlling element having an enlarged radial surface co-operating with a bore to provide fluid damping enhancing stability of the pressure controlling element when activated by a pulsed electric signal.

10. The brake control system defined in claim 9 wherein the pressure controlling element of the isolation valve comprises a movable valve closing portion adjacent a fixed valve seat, a radially large cylindrical land adjacent the valve closing portion forming a first annular gap with a large diameter cylindrical chamber open to fluid in the valve, an armature and a radially small rod portion axially connecting the cylindrical land and the armature and forming a second annular gap with a small diameter chamber, the first annular gap providing resistance to fluid flow therethrough for fluid damping during pulsed axial activation of the armature and the second annular gap providing no significant fluid damping during pulsed axial activation of the armature.

* * * * *